(12) United States Patent
Lee et al.

(10) Patent No.: US 7,143,198 B2
(45) Date of Patent: Nov. 28, 2006

(54) DOCKING STATION FOR PORTABLE COMPUTER

(75) Inventors: Cheon-moo Lee, Suwon (KR); Il-han Lee, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 108 days.

(21) Appl. No.: 10/679,320

(22) Filed: Oct. 7, 2003

(65) Prior Publication Data
US 2004/0148445 A1 Jul. 29, 2004

(30) Foreign Application Priority Data
Jan. 24, 2003 (KR) .................. 10-2003-0004884

(51) Int. Cl.
*G06F 3/00* (2006.01)
(52) U.S. Cl. ............................. 710/2; 710/38
(58) Field of Classification Search .................. 710/2, 710/72, 300, 8, 36, 38
See application file for complete search history.

(56) References Cited

U.S. PATENT DOCUMENTS

RE36,381 E * 11/1999 Boyle et al. ................ 361/686
6,834,351 B1 * 12/2004 Kabenjian .................... 713/201
6,882,912 B1 * 4/2005 DiLodovico et al. .......... 701/35
2002/0038400 A1 * 3/2002 Fukushima ................. 710/300
2002/0042763 A1 * 4/2002 Ortiz et al. .................... 705/26

FOREIGN PATENT DOCUMENTS

| JP | 11-103331 | 4/1999 |
| JP | 11-346230 | 12/1999 |
| JP | 2000-200122 | 7/2000 |
| JP | 2001-51749 | 2/2001 |
| JP | 2001-344043 | 12/2001 |
| KR | 10-212705 | 5/1999 |

OTHER PUBLICATIONS

Chinese Patent Office Action corresponding to Chinese Patent Application No. 200310118191.3.

* cited by examiner

*Primary Examiner*—Fritz Fleming
*Assistant Examiner*—Harold Kim
(74) *Attorney, Agent, or Firm*—Staas & Halsey LLP (57) ABSTRACT

A network connection state can be conveniently changed to a wired or a wireless connection state according to whether a portable computer body is attached to a docking station including an Access Point part or not.

21 Claims, 5 Drawing Sheets

DOCKING STATION FOR PORTABLE COMPUTER

CROSS-REFERENCE TO RELATED APPLICATIONS

This application claims the benefit of Korean Patent Application No. 2003-4884, filed on Jan. 24, 2003, in the Korean Intellectual Property Office, the disclosure of which is incorporated herein by reference.

BACKGROUND OF THE INVENTION

1. Field of the Invention

The present invention relates to a docking station for a portable computer, and, more particularly, to a docking station for a portable computer alternating between a wired local area network (LAN) connection and a wireless LAN connection by providing a LAN connection part and an Access Point.

2. Description of the Related Art

A separate device such as a docking station has been used so that a portable computer such as a notebook computer can perform functions comparable to a desktop computer. Accordingly, the docking station has a separate power supply part, and can include: serial ports to connect input devices such as a mouse and a keyboard to the docking station; a LAN connection port to which a LAN cable can be connected to access an external network such as an Internet; and a peripheral port to connect output devices such as a printer or an external display apparatus with the docking station. Also, the docking station can be connected to an external storage apparatus such as a floppy disk drive (FDD) or an optical disk drive, so that the portable computer can be used in a manner that is similar to the desktop computer.

Figure 4A:
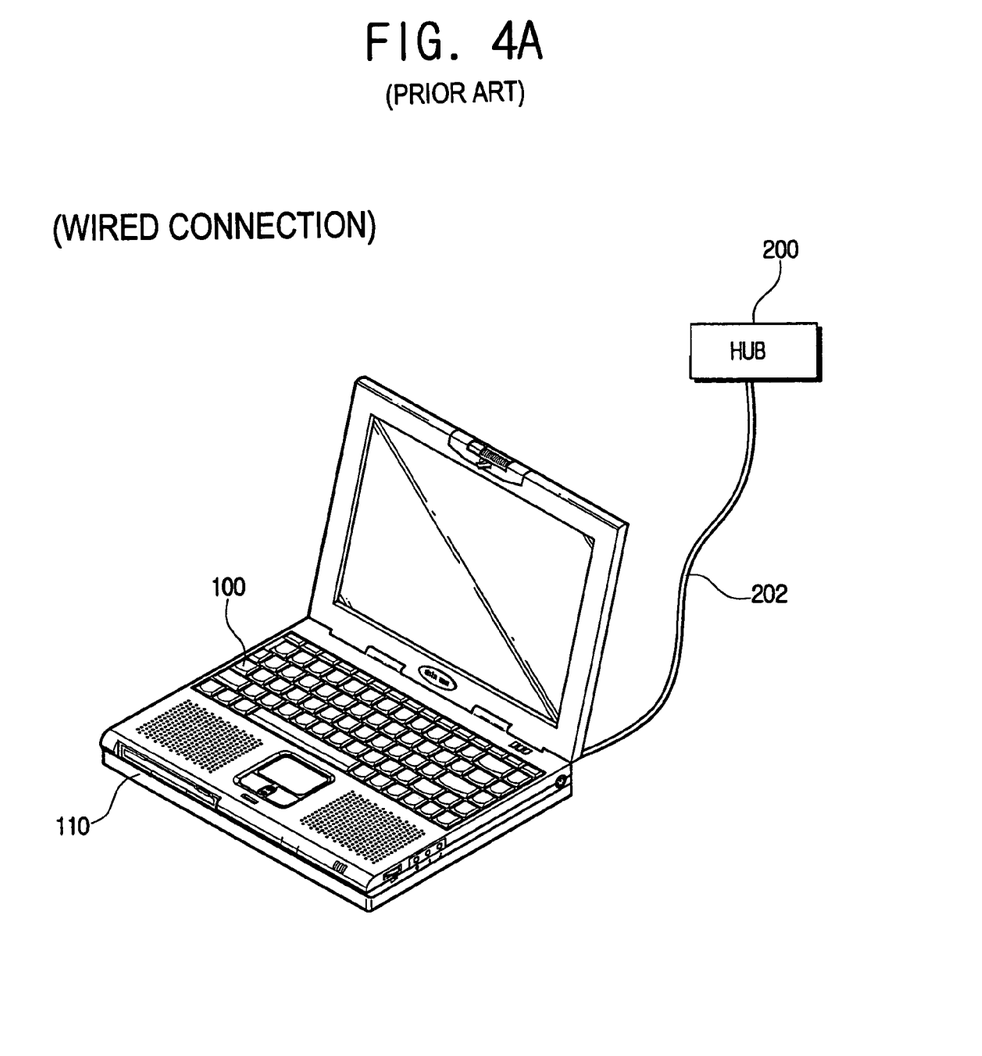
FIGS. 4A and 4B are views illustrating a wired and a wireless LAN connection according to a conventional portable computer and docking station.
Figure 4B:
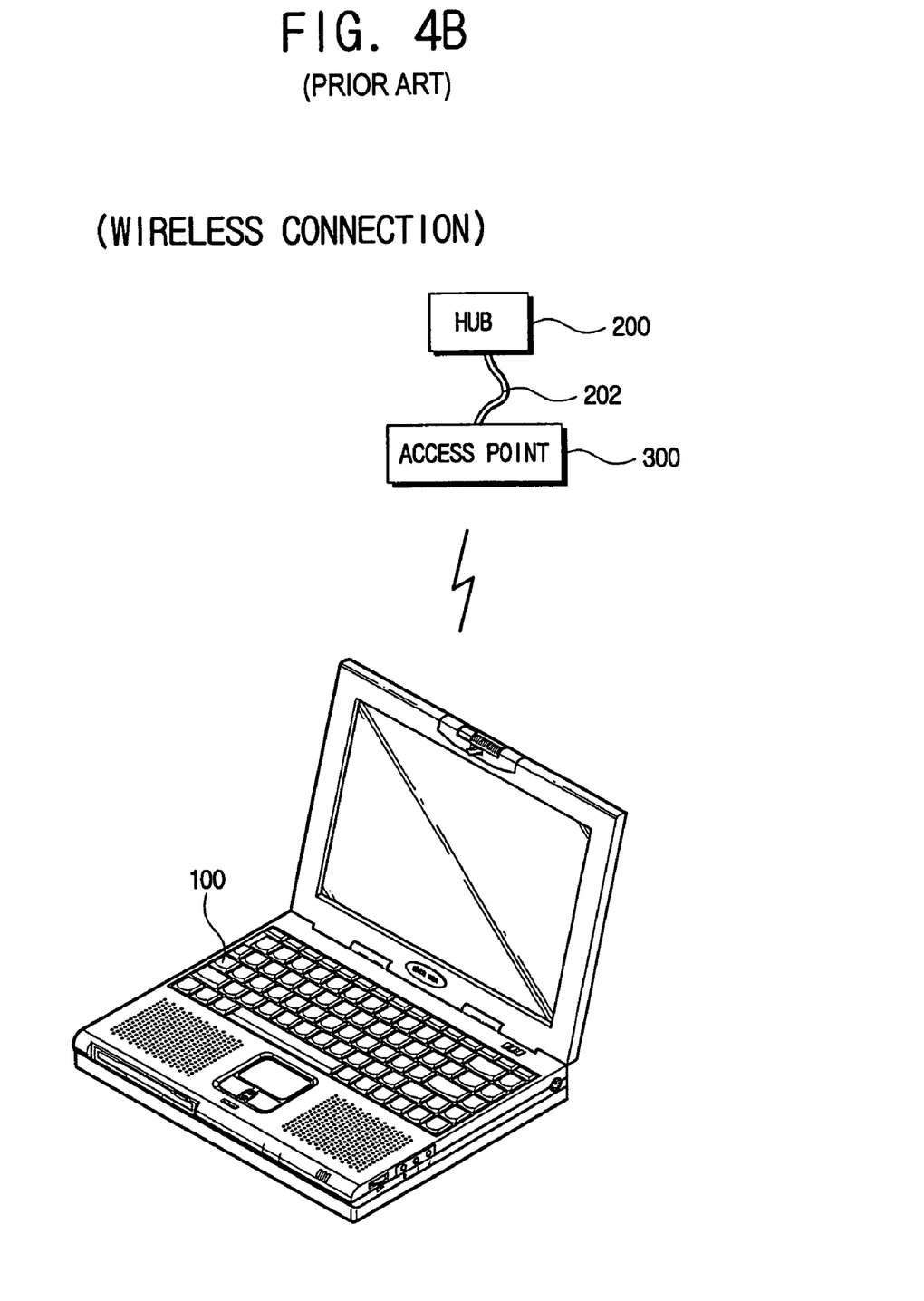

FIG. 4A illustrates that a portable computer 100 having a wired LAN adapter (not shown) is mounted on a docking station 110 so that a user can have wired access to an Internet or the like in an office or a home by using a conventional portable computer 100. When a user has wired access to the Internet by using the portable computer 100, a LAN cable 202 connected to an external network through a hub 200 and allowing a LAN signal to be transmitted therethrough, is connected to a LAN connection port (not shown: generally, a RJ-45 LAN port) included in the docking station 110. Accordingly, according to a 100Base-T of LAN specification, a network can be accessed with data transfer rates supported up to 100 Mbps. FIG. 4B illustrates that a user wirelessly accesses an external network such as an Internet by using the conventional portable computer 100. As shown in FIG. 4B, the LAN cable 202 connected to the hub 200 and used to access the external network such as the Internet is connected to a LAN connection port (not shown) included in an Access Point 300 generating a wireless LAN signal. Accordingly, because a wireless LAN adapter (not shown) included in the conventional portable computer 100 can receive and transmit the wireless LAN signal generated in the Access point 300, the network can be wirelessly accessed with a data transfer rate supported up to 11 Mbps according to an IEEE802.11b wireless LAN standard.

Like this, conventionally, an Access Point, an apparatus that can transmit a wireless signal, needs to be used so that a user can wirelessly access an external network including the Internet by using a portable table computer having a wireless LAN adapter. Thus, if a user wants to change a wired LAN connection to a wireless LAN connection, the user must disconnect a LAN cable from a docking station and then connect again the LAN cable to the Access Point, which may be a troublesome and time-consuming job.

SUMMARY OF THE INVENTION

Accordingly, it is an aspect of the present invention to provide a docking station for a portable computer alternating between a wired LAN connection and a wireless LAN connection according to a state of attachment or detachment of the portable computer to the docking station that includes a LAN connection part and an Access Point therein.

Additional aspects and/or advantages of the present invention will be set forth in part in the description that follows and, in part, will be obvious from the description, or may be learned by practicing the present invention.

The foregoing and/or other aspects of the present invention are achieved by providing a docking station for a portable computer, which is detachably attached to a portable computer body, and which includes a wired network adapter and a wireless network adapter, the docking station comprising: a network connection part into which a network signal is inputted; an Access Point part to generate a wireless LAN signal for a wireless network connection according to the network signal provided from the network connection part; a switching part allowing the network signal provided from the network connection part to be transmitted to the wired network adapter or the Access Point part provided in the portable computer body according to an attachment or detachment state of the portable computer body and the docking station.

In an aspect, the switching part allows the network signal provided from the network connection part to be transmitted to the wired network adapter provided in the portable computer body when the portable computer body is attached to the docking station.

In an aspect, the switching part allows the network signal provided from the network connection part to be transmitted to the Access Point part when the portable computer body is detached from the docking station.

In an aspect, the Access Point part transmits the wireless network signal generated by a transmitted network signal to the wireless network adapter provided in the portable computer body when the portable computer body is detached from the docking station.

BRIEF DESCRIPTION OF THE DRAWINGS

These and other aspects and/or advantages of the present invention will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present invention, examples of which are illustrated in the accompanying drawings, wherein like reference numerals refer to like elements throughout. The embodiments are described below in order to explain the present invention by referring to the figures.

Figure 1:
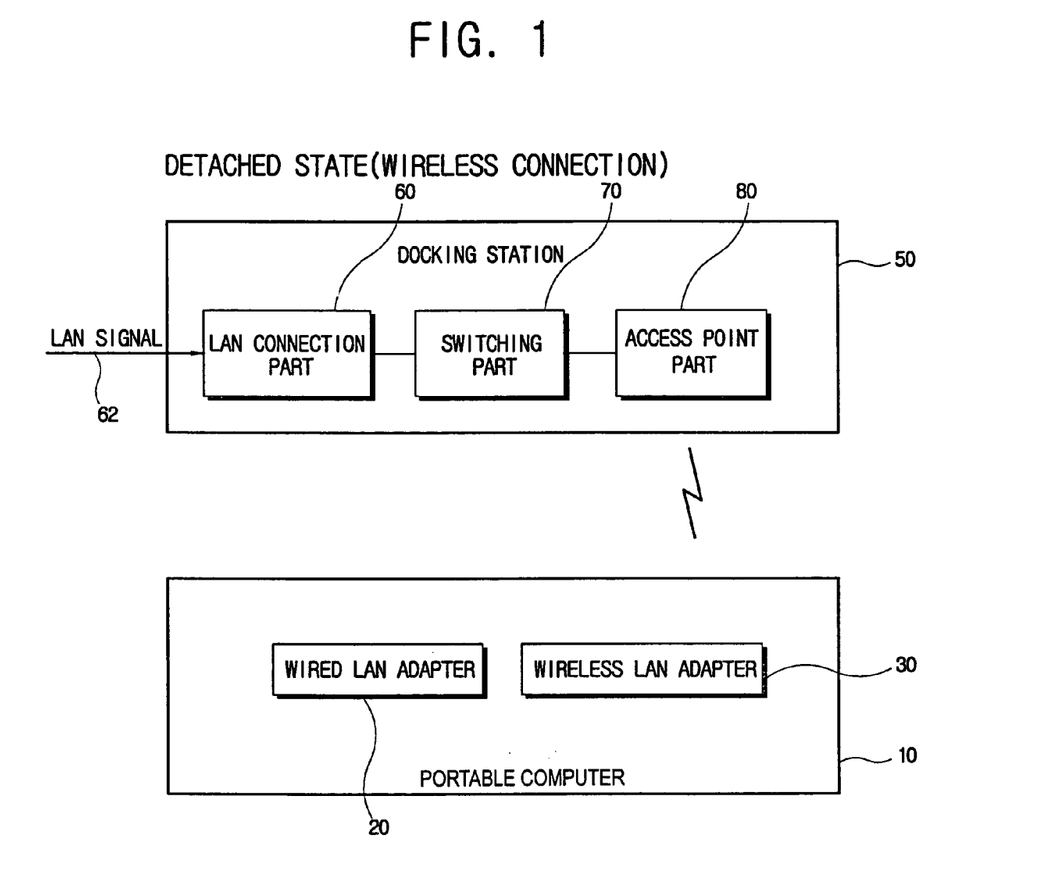
FIG. 1 is a block diagram illustrating a wireless LAN connection using a docking station according to an embodiment of the present invention.

FIG. 1 is a block diagram illustrating a portable computer wirelessly connected to a LAN using a docking station that includes an Access Point part according to the present invention. However, embodiments of the present invention are not limited to a LAN, as any network may be connected. In an embodiment, a display apparatus (not shown) such as a liquid crystal display (LCD) to display an image according to a video signal is connected to a portable computer body 10 by a hinge. A wired LAN adapter 20 and a wireless LAN adapter 30 are included in the portable computer body 10 as network-accessing devices. A LAN adapter is generally called a LAN card, and, in an embodiment, may be mounted on a PERSONAL COMPUTER MEMORY CARD INTERNATIONAL ASSOCIATION (PCMCIA) port included in the portable computer body 10 or mounted into the portable computer body 10 in a module structure. A docking station 50 for expanding the functionality of a portable computer includes a LAN connection part 60 to which a LAN cable 62 transmitting a LAN signal from a hub connected to an external network is connected, a switching part 70 to alternate a wired LAN connection and a wireless LAN connection according to attachment and/or detachment of the portable computer body 10 to the docking station 50, and an Access Point part (AP part) 80 to generate a wireless LAN signal on the basis of the LAN signal transmitted through the switching part 70, which are devices for network access. Generally, an unshielded twisted pair (UTP) cable having RJ-45 jacks on both ends thereof is used for the LAN cable 62. However, embodiments of the present invention are not so limited, as a different type of cable may be used. The LAN connection part 60 includes a LAN port (not illustrated) for inserting the RJ-45 jacks.

Accordingly, when a user wirelessly accesses an Internet and the like with the portable computer body 10 detached from the docking station 50, the LAN signal is inputted into the docking station 50 through the LAN connection part 60 because the LAN cable 62 is connected to the LAN connection part 60 of the docking station 50. Herein, the switching part 70 determines that the portable computer body 10 is detached from the docking station 50 and provides the LAN signal to the Access Point part 80. The Access Point part 80 generates a wireless LAN signal on the basis of a provided LAN signal and transmits the wireless LAN signal to the wireless LAN adapter 30 in the portable computer body 10, to thereby allow a user to wirelessly access the Internet and the like.

Figure 2:
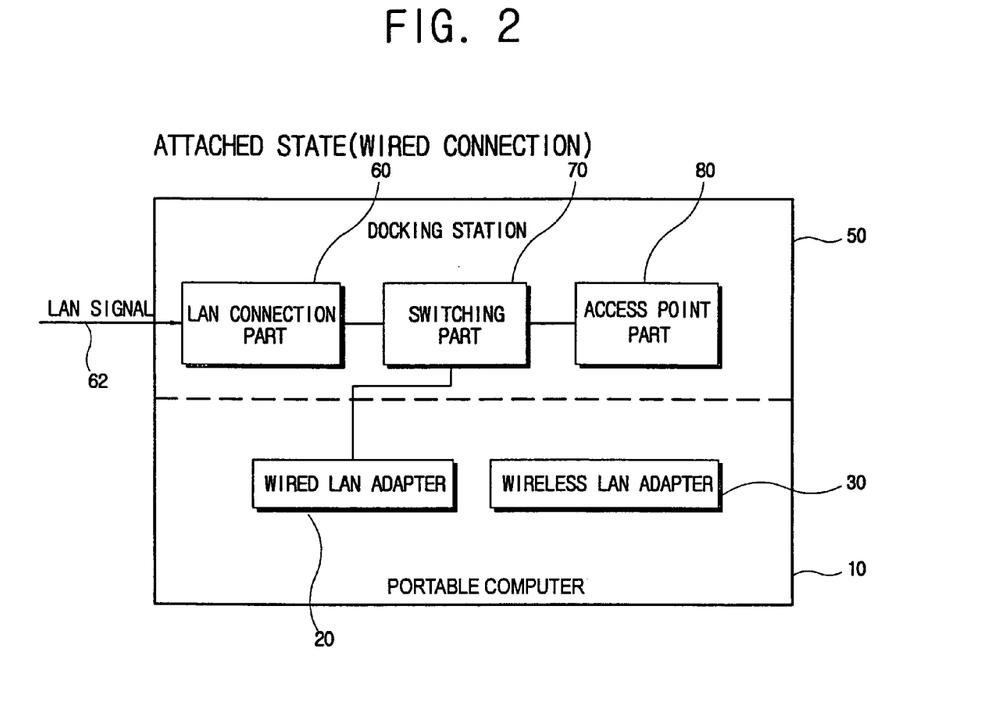
FIG. 2 is a block diagram illustrating a wired LAN connection using a docking station according to an embodiment of the present invention.

In the interim, as shown in FIG. 2, when a user has wired access to an Internet and the like with the portable computer body 10 attached to the docking station 50, the LAN signal is inputted into the docking station 50 through the LAN connection part 60 because the LAN cable 62 is connected to the LAN connection part 60 of the docking station 50. Herein, the switching part 70 determines that the portable computer body 10 is attached to the docking station 50 and directly provides the LAN signal to the wired LAN adapter 20 provided in the portable computer body 10, to thereby allow a user to have wired access to the Internet and the like.

Also, the switching part 70 of the docking station 50 may use a connection state of a ground connection pin of a docking port (not shown) allowing the docking station 50 to be mounted on the portable computer body 10 as a signal detecting attachment or not of the portable computer body 10.

Figure 3:
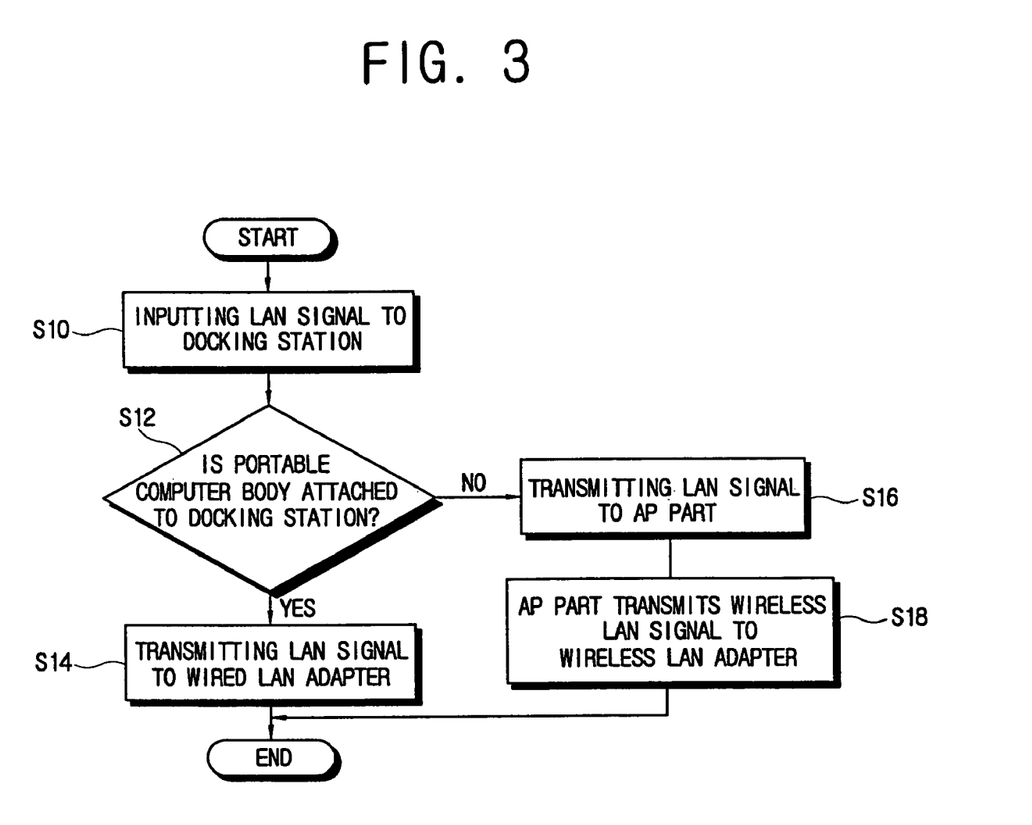
FIG. 3 is a flow diagram illustrating a LAN connection process using a docking station according to an embodiment of the present invention.

According to the present invention, a process having wired or wireless access to the external network such as the Internet by providing the Access Point part 80 in the docking station 50 of the portable computer will be described with reference to FIG. 3. At first, the LAN cable 62 is connected to the LAN connection part 60 of the docking station 50 having the Access Point part 80, to thereby enable the LAN signal to be inputted to the docking station 50 (S10). When a user intends to access the Internet by using the portable computer, it is determined whether the portable computer body 10 is attached to the docking station 50 (S12). Herein, it is interpreted that when the portable computer body 10 is detached from the docking station 50, a user wants to wirelessly access the Internet. Accordingly, the switching part 70 of the docking station 50 detects that the portable computer body 10 is detached from the docking station 50 on the basis of a detecting signal from the ground connection pin (not shown) of the docking port, and allows the LAN signal to be transmitted to the Access Point part 80 (S16). The Access Point part 80 generates a wireless LAN signal and transmits the wireless LAN signal to the wireless LAN adapter 30 of the portable computer body 10 (S18). In the interim, when the portable computer body 10 is attached to the docking station 50, the switching part 70 of the docking station 50 detects that the portable computer body 10 is attached to the docking station 50 on the basis of the detecting signal from the ground connection pin (not shown) of the docking port. Thus, the LAN signal is transmitted to the wired LAN adapter 20 that is included in the portable computer body 10 (S14).

Like this, according to the present invention, because the Access Point part 80 for a wireless LAN connection is included in the docking station 50 allowing the portable computer body 10 to be mounted thereon, once the LAN cable 62 is connected to the LAN connection part 60 of the docking station 50, a user can have wired or wireless access to the network such as the Internet simply and fast at the user's convenience. In the conventional system, when a user tried to wirelessly access the Internet by using a conventional portable computer, the user had to disconnect a LAN cable from a docking station and connect again the LAN cable to an external Access Point part. However, according to the present invention, the docking station 50 includes the Access Point part. Thus, the switching part 70 determines whether the portable computer body 10 is attached to the docking station 50 and changes a network connection state to a wired or wireless connection state automatically, conveniently and fast.

As described above, a LAN connection state can be conveniently changed to a wired or a wireless connection state according to whether a portable computer body is attached to a docking station including an Access Point part. Also, because the Access Point part is included in the docking station, it is unnecessary to install computer peripherals for a wireless LAN connection. Further, disconnecting and connecting again the LAN cable is unnecessary.

The hardware included in the system may include memories, processors, and/or Application Specific Integrated Circuits ("ASICs"). Such memory may include a machine-readable medium on which is stored a set of instructions (i.e., software) embodying any one, or all, of the methodologies described herein. Software can reside, completely or at least partially, within this memory and/or within the processor and/or ASICs. For the purposes of this specification, the term "machine-readable medium" shall be taken to include any mechanism that provides (i.e., stores and/or transmits) information in a form readable by a machine (e.g., a computer). For example, a machine-readable medium includes read only memory ("ROM"), random access memory ("RAM"), magnetic disk storage media, optical storage media, flash memory devices, electrical, optical, acoustical, or other form of propagated signals (e.g., carrier waves, infrared signals, digital signals, etc.), etc.

Although a few embodiments of the present invention have been shown and described, it will be appreciated by those skilled in the art that changes may be made in these embodiments without departing from the principles and spirit of the present invention, the scope of which is defined in the appended claims and their equivalents.

What is claimed is:

1. A docking station for a portable computer, which is detachably attached to a portable computer body, and the portable computer which includes a wired network adapter and a wireless network adapter,
   the docking station comprising:
   a network connection part into which a network signal is inputted;
   an Access Point part to generate a wireless network signal for a wireless network connection according to the network signal provided from the network connection part; and
   a switching part connected between the network connection part and the Access Point part to determine an attachment state and detachment state of the portable computer body and the docking station, and to alternate between a wired LAN connection and a wireless LAN connection according to the attachment or detachment state of the portable computer body and the docking station, by transmitting the network signal provided from the network connection part directly to the wired network adapter to establish the wired LAN connection or the Access Point part to wirelessly transmit the wireless network signal to the wireless network adapter provided in the portable computer body, thereby establishing the wireless LAN connection,
   wherein the Access Point part is integrated within the docking station.

2. The docking station for the portable computer according to claim 1, wherein the switching part allows the network signal provided from the network connection part to be transmitted to the wired network adapter provided in the portable computer body when the portable computer body is attached to the docking station.

3. The docking station of claim 2, wherein the switching part allows the network signal provided from the network connection part to be transmitted to the Access Point part when the portable computer body is detached from the docking station.

4. The docking station for the portable computer according to claim 1, wherein the switching part allows the network signal provided from the network connection part to be transmitted to the Access Point part when the portable computer body is detached from the docking station.

5. The docking station for the portable computer according to claim 4, wherein the Access Point part transmits the wireless network signal generated by a transmitted network signal to the wireless network adapter provided in the portable computer body when the portable computer body is detached from the docking station.

6. The docking station of claim 1, wherein the wired network adapter and the wireless network adapter are provided for a local area network (LAN) connection.

7. The docking station of claim 1, wherein the wired network adapter and the wireless network adapter are provided for an Internet connection.

8. A system comprising:
   a network;
   a portable computer, comprising:
      a wired network adapter, and
      a wireless network adapter; and
   a docking station to physically connect to the portable computer, comprising:
      a network connecting unit to receive a network signal from the network,
      a switching unit connected between the network connecting unit and an access point unit of the docking station, to determine an attachment state and detachment state of the portable computer and the docking station, and to selectively transmit the network signal from the network connecting unit to the access point unit when the portable computer is not physically connected to the docking stations and to selectively transmit the network signal from the network connecting unit directly to the wired network adapters when the portable computer is physically connected to the docking station, and
      the access point unit to generate a wireless network signal from the network signal and to wirelessly transmit the wireless network signal to the wireless network adapter when the portable computer is not physically connected to the docking station,
      wherein the access point unit is integrated within the docking station.

9. The system of claim 8, wherein the network is a local area network (LAN).

10. The system of claim 8, wherein the network is an Internet.

11. The system of claim 8, wherein the docking station further comprises:
    a docking port having a ground connection pin,
    wherein the switching unit determines whether the portable computer is physically connected to the docking station based on a state of the ground connection pin of the docking port.

12. The system of claim 11, wherein the state of the ground connection pin changes according to attachment/detachment of the portable computer to/from the docking station.

13. A method, comprising:
    receiving a network signal from a network;
    determining whether a portable computer is physically connected to a docking station via a switching part within the docking station;
    selectively transmitting the network signal directly to a wired network adapter that is included in the portable computer via the switching part, when the portable computer is physically connected to the docking station; and
    selectively transmitting the network signal via the switching part, to an Access Point part which is integrated within the docking station, the Access Point part generating a wireless network signal from the network signal, and wirelessly transmitting the wireless network signal to a wireless network adapter that is included in the portable computer when the portable computer is not physically connected to the docking station.

14. The method of claim 13, wherein the network is a local area network (LAN).

15. The method of claim 13, wherein the network is an Internet.

16. The method of claim 13, wherein the docking station comprises a docking port, the method further comprising:
   determining whether the portable computer is physically connected to the docking station based on a state of a ground connection pin of the docking port.

17. A computer-readable storage medium that provides instructions, which, when executed by a computer, cause the computer to perform a method comprising:
   receiving a network signal from a network;
   determining whether a portable computer is physically connected to a docking station via a switching part within the docking station;
   selectively transmitting the network signal directly to a wired network adapter that is included in the portable computer via the switching part, when the portable computer is physically connected to the docking station; and
   selectively transmitting the network signal via the switching part, to an Access Point part which is integrated within the docking station, the Access Point part generating a wireless network signal from the network signal, and wirelessly transmitting the wireless network signal to a wireless network adapter that is included in the portable computer when the portable computer is not physically connected to the docking station.

18. The computer-readable storage medium of claim 17, wherein the network is a local area network (LAN).

19. The computer-readable storage medium of claim 17, wherein the network is an Internet.

20. The computer-readable storage medium of claim 17, wherein the docking station comprises a docking port, the method further comprising:
   determining whether the portable computer is physically connected to the docking station based on a state of a ground connection pin of the docking port.

21. A method, comprising:
   determining whether a portable computer is physically connected to a docking station via a switching part within the docking station;
   selectively transmitting a network signal via the switching part, directly to a wired network adapter that is included in a portable computer when the portable computer is physically connected to a docking station; and
   selectively transmitting the network signal via the switching part, to an Access Point part that is integrated within the docking station, the Access Point part generating a wireless network signal from the network signal, and wirelessly transmitting the wireless network signal to a wireless network adapter that is included in the portable computers, when the portable computer is not physically connected to the docking station.

* * * * *

UNITED STATES PATENT AND TRADEMARK OFFICE
CERTIFICATE OF CORRECTION

| | | |
|---|---|---|
| PATENT NO. | : 7,143,198 B2 | Page 1 of 1 |
| APPLICATION NO. | : 10/679320 | |
| DATED | : November 28, 2006 | |
| INVENTOR(S) | : Cheon-moo Lee et al. | |

It is certified that error appears in the above-identified patent and that said Letters Patent is hereby corrected as shown below:

First Page, Column 2 (U.S. Patent Documents), Line 4, change "2002/0042763" to --2002/0042753--.

Column 6, Line 25, change "stations" to --station,--.

Column 6, Line 27, change "adapters" to --adapter,--.

Column 8, Line 28, change "computers," to --computer,--.

Signed and Sealed this

Twentieth Day of March, 2007

JON W. DUDAS
*Director of the United States Patent and Trademark Office*